United States Patent
Li et al.

(10) Patent No.: US 11,603,081 B2
(45) Date of Patent: Mar. 14, 2023

(54) TANK TRUCK ROLLOVER RELIEVED CONTROL METHOD BASED ON ELECTRONIC BRAKING DECELERATION

(71) Applicant: SOUTHEAST UNIVERSITY, Nanjing (CN)

(72) Inventors: Xu Li, Nanjing (CN); Kun Wei, Nanjing (CN); Qimin Xu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/764,871

(22) PCT Filed: Apr. 12, 2021

(86) PCT No.: PCT/CN2021/086569
§ 371 (c)(1),
(2) Date: Mar. 29, 2022

(87) PCT Pub. No.: WO2021/258813
PCT Pub. Date: Dec. 30, 2021

(65) Prior Publication Data
US 2022/0348174 A1    Nov. 3, 2022

(30) Foreign Application Priority Data
Jun. 24, 2020   (CN) .......................... 202010587839.5

(51) Int. Cl.
B60T 8/1755   (2006.01)

(52) U.S. Cl.
CPC ....... B60T 8/17554 (2013.01); B60T 2210/20 (2013.01); B60T 2210/24 (2013.01);
(Continued)

(58) Field of Classification Search
CPC ............ B60T 8/17554; B60T 2210/04; B60T 2210/20; B60T 2210/24; B60T 2250/02;
(Continued)

(56) References Cited

U.S. PATENT DOCUMENTS

| 7,020,551 B2 * | 3/2006 | Goebels .................... B60T 8/36 701/91 |
| 7,165,644 B2 * | 1/2007 | Offerle .................. B60T 8/1755 303/146 |

(Continued)

FOREIGN PATENT DOCUMENTS

| CN | 101253084 A | 8/2008 |
| CN | 106875510 A | 6/2017 |

(Continued)

OTHER PUBLICATIONS

Zhu, et al.; Rollover prevention for heavy trucks using robust control; Aug. 8, 2009; 2009 ISECS International Colloquium on Computing, Communication, Control, and Management; pp. 182-185 (https://ieeexplore.ieee.org/document/5267876) (Year: 2009).*

(Continued)

*Primary Examiner* — Atul Trivedi
(74) *Attorney, Agent, or Firm* — Muncy, Geissler, Olds & Lowe, P.C.

(57) ABSTRACT

For a tank truck using an EBS, the present invention provides a tank truck rollover relieved control method based on electronic braking deceleration. Firstly, a tank truck rollover scene applicable to the relieved control method is defined; then, a least square method is adopted to establish a characterization function of tank truck braking deceleration; and finally, tank truck rollover relieved control is achieved on the basis of the characterization function of the braking deceleration and the EBS. The method fits out a function expression of the tank truck braking deceleration and can automatically select a proper braking deceleration (Continued)

under different rollover scenes according to kinematics information of the tank truck and vehicle body information; during tank truck braking deceleration, an operation of a driver is considered, so that man-machine effective combination is achieved; and relieved braking deceleration is conducted when the tank truck is in a potential rollover risk state, a situation that emergency braking is conducted when the tank truck has high rollover risk is avoided, and tank truck rollover control stability and effectiveness are improved.

1 Claim, 2 Drawing Sheets

(52) U.S. Cl.
CPC ....... *B60T 2220/04* (2013.01); *B60T 2250/02* (2013.01); *B60T 2250/04* (2013.01); *B60T 2270/304* (2013.01); *B60T 2270/82* (2013.01)

(58) Field of Classification Search
CPC .......... B60T 2250/04; B60T 2270/304; B60T 2270/82
USPC .......................................................... 701/70
See application file for complete search history.

(56) References Cited

U.S. PATENT DOCUMENTS

| | | | | |
|---|---|---|---|---|
| 7,321,825 | B2 * | 1/2008 | Ranalli | G05D 1/0278 340/995.23 |
| 7,778,741 | B2 * | 8/2010 | Rao | B60T 8/1725 701/1 |
| 8,983,722 | B2 * | 3/2015 | Moshchuk | B60G 17/016 340/440 |
| 10,046,770 | B1 | 8/2018 | Sabri | |
| 2004/0102894 | A1 * | 5/2004 | Holler | B60T 8/17554 340/425.5 |
| 2008/0059021 | A1 * | 3/2008 | Lu | B60G 17/0195 701/36 |
| 2008/0086251 | A1 * | 4/2008 | Lu | B60T 8/1755 701/70 |
| 2017/0051697 | A1 * | 2/2017 | Campbell | H04W 4/90 |
| 2017/0225639 | A1 * | 8/2017 | Chacon | G01S 19/42 |
| 2018/0339566 | A1 * | 11/2018 | Ericksen | B60G 17/08 |
| 2019/0375394 | A1 * | 12/2019 | Maleki | B60W 20/11 |
| 2019/0375407 | A1 * | 12/2019 | Maleki | B60W 30/14 |
| 2022/0219691 | A1 * | 7/2022 | Maleki | G06F 11/079 |

FOREIGN PATENT DOCUMENTS

| | | | | |
|---|---|---|---|---|
| CN | 107097775 | A | | 8/2017 |
| CN | 108025796 | A | | 5/2018 |
| CN | 108407800 | A * | | 8/2018 ............ B60W 10/02 |
| CN | 108473117 | A | | 8/2018 |
| CN | 108657175 | A * | | 10/2018 ............ B60W 10/06 |
| CN | 109368076 | A * | | 2/2019 ............ B65D 90/48 |
| CN | 109977500 | A | | 7/2019 |
| CN | 110001657 | A | | 7/2019 |
| CN | 110281888 | A | | 9/2019 |
| CN | 110533796 | A | | 12/2019 |
| CN | 110775046 | A * | | 2/2020 |
| CN | 111216787 | A * | | 6/2020 |
| CN | 111775912 | A | | 10/2020 |
| DE | 19958895 | A1 * | | 6/2000 .......... B60T 8/17554 |
| EP | 1046571 | A2 * | | 10/2000 ................ B60T 7/12 |
| EP | 3862237 | A1 * | | 8/2021 ............ B60R 25/08 |
| GB | 2441420 | A * | | 3/2008 .......... B60T 8/17552 |
| GB | 2441421 | A * | | 3/2008 ............ B60T 8/1755 |
| GB | 2441423 | A * | | 3/2008 ............. B60T 8/171 |
| JP | 2015033872 | A | | 2/2015 |
| PL | 225483 | B1 * | | 4/2017 |
| WO | WO-2007081020 | A1 * | | 7/2007 ............. B60T 7/126 |
| WO | WO-2021186349 | A1 * | | 9/2021 ............ B60T 13/662 |

OTHER PUBLICATIONS

Kim, et al.; Coordinated Steering and Braking Control for Roll Stability of Automated Driving Commercial Vehicles; Sep. 19, 2021; 2021 IEEE International Intelligent Transportation Systems Conference (ITSC); pp. 2569-2572 (https://ieeexplore.ieee.org/document/9564941) (Year: 2021).*

* cited by examiner

TANK TRUCK ROLLOVER RELIEVED CONTROL METHOD BASED ON ELECTRONIC BRAKING DECELERATION

TECHNICAL FIELD

The present invention relates to a tank truck rollover control method, in particular to a tank truck rollover relieved control method based on electronic braking deceleration, and belongs to the technical field of vehicle safety.

BACKGROUND

A tank truck is a transport vehicle with a tank-shaped vehicle body and is used for loading and transporting various liquid, liquefied gas, powdery goods and the like. The tank truck is high in highway transportation capability, high in efficiency and low in cost, so it provides huge convenience conditions for remote transportation of hazardous chemical substances, and therefore the tank truck has become a main body for highway transportation of the hazardous chemical substances. However, a truck body structure of the tank truck has particularity and complexity (the center of mass is high, the wheel tread is narrow, the whole truck is large in mass, and deflection of the center of mass is likely to occur due to liquid disturbance), and the tank truck causes traffic accidents on high-grade highways frequently and has become a main source for influencing road traffic safety. Reasons for various traffic accidents and proportions of the reasons are concluded and analyzed according to 708 hazardous goods tank truck traffic accidents recorded in documents, and the main reasons for the tank truck traffic accidents are single-side rollover, run-off-roadway, two-vehicle rear-end collisions, two-vehicle side collisions and the like, where the single-side rollover accounts for the largest proportion (29.10%).

At present, an active anti-rollover control method is mainly adopted for tank truck rollover prevention and includes an active transverse stabilizer bar, active steering control, active suspension control and differential braking control. Since the effects of the active transverse stabilizer bar, the active steering control and the active suspension control on tank truck rollover prevention control are limited and excessive hardware devices need to be installed, the differential braking control becomes a common rollover control method for the tank truck. A large number of studies have been carried out on the differential braking control, but there still has the following problems:

1, during differential braking, operation of a driver is not considered, and execution of a mechanism operation possibly conflicts with operation of the driver, or the driver may adopts more effective operation; and 2, the differential braking is to adopt an emergency braking measure when the tank truck has high rollover risk, consequently, the truck body control stability is low; however, if braking deceleration can be conducted before the tank truck enters a rollover risk state, the anti-rollover effect is better.

According to the GB7258-2017 regulation, dangerous freight vehicles with a total mass exceeding 12 tons need to be provided with an Electronic Braking System (EBS) which can be in communication with the vehicle through a CAN data bus. The EBS obtains a braking intention according to opening degree changes of a brake pedal, an opening degree of the brake pedal corresponds to braking strength, and a braking force of each wheel is dynamically adjusted according to a vertical load, a wheel slip rate and other information.

SUMMARY

For the problems of low tank truck rollover control stability and effectiveness, the present invention provides a tank truck rollover relieved control method based on electronic braking deceleration. The method performs relieved braking deceleration in combination with operations of a driver when a tank truck is in a potential rollover risk state, a situation that emergency braking is conducted when the tank truck has high rollover risk is avoided, and the tank truck rollover control stability and effectiveness are improved.

To achieve the above objective, the present invention provides the following technical solutions:

step 1: defining a tank truck rollover scene applicable to the relieved control method the applicable rollover scene includes that a tank truck normally runs at present, but a sharp turn exists in front, and if the tank truck passes through the sharp turn at a current vehicle speed, the tank truck may roll over;

step 2: adopting a least square method to establish a characterization function of tank truck braking deceleration a function expression of the tank truck braking deceleration a is defined as:

$$a = c_1\lambda^2 + c_2\lambda + c_3 m^2 + c_4 m + b \tag{1}$$

in formula (1), $c_1$, $c_2$, $c_3$ and $c_4$ are coefficients, and b is a constant term;

scene elements for a braking test include vehicle speed, load and an opening degree of a brake pedal, quantization parameters of each scene element are shown in the following table, 36 test scenes exist after the scene elements are permutated and combined, a test is repeatedly conducted twice in each test scene, and totally 72 tests are conducted;

| Scene element | Quantization parameters |
| --- | --- |
| Vehicle speed | 30 km/h, 50 km/h, 70 km/h |
| Load | No load, half load, full load |
| Opening degree of the brake pedal | 20%, 40%, 60%, 80% | a medium loaded in the tank truck for the braking test is water, and a computational formula of a whole truck mass m of the tank truck is:

$$m = \begin{cases} m' & \text{No load} \\ m' + 0.5\rho V & \text{Half load} \\ m' + \rho V & \text{Full load} \end{cases} \tag{2}$$

in formula (2), m' is a whole truck mass when the tank truck is no-load, V is a volume of the tank truck, ρ is a density of the water, and m' and V are obtained through a tank truck product manual;

in a straight road segment, the tank truck runs at a constant vehicle speed v' of 30 km/h, 50 km/h and 70 km/h, a CAN data bus is used for controlling the brake pedal to decelerate with a certain opening degree of 20%, 40%, 60% and 80% until the vehicle speed of the tank truck is zero, a time from starting deceleration to the zero vehicle speed of the tank truck is recorded as Δt, and a computational formula of the braking deceleration a is:

$$a = \frac{v'}{\Delta t} \quad (3)$$

after 72 times of the braking test, test data $\{\lambda_i, m_i, a_i\}$ is obtained, i=1, 2, . . . , 72; a square of total errors in the least square method is:

$$J(c_1, c_2, c_3, c_4, b) = \sum_{i=1}^{72} (c_1\lambda_i^2 + c_2\lambda_i + c_3 m_i^2 + c_4 m_i + b - a_i)^2 \quad (4)$$

when the square $J(c_1, c_2, c_3, c_4, b)$ of the total errors is a minimum value, $c_1, c_2, c_3, c_4$ and b are optimal solutions, and a computational formula is:

$$\begin{cases} \frac{\partial J}{\partial c_1} = 0 \\ \frac{\partial J}{\partial c_2} = 0 \\ \frac{\partial J}{\partial c_3} = 0 \rightarrow c_1, c_2, c_3, c_4, b \\ \frac{\partial J}{\partial c_4} = 0 \\ \frac{\partial J}{\partial b} = 0 \end{cases} \quad (5)$$

correspondingly, a functional expression $a=c_1\lambda^2+c_2\lambda+c_3m^2+c_4m+b$ of the tank truck braking deceleration a is obtained; and step 3: achieving tank truck rollover relieved control on the basis of the characterization function of the braking deceleration and EBS sub-step 1: acquiring a current vehicle speed installing wheel speed sensors on non-steering wheels at two sides of a last shaft of the tank truck, outputting two-side wheel speeds $v_1$ and $v_2$ in real time, and defining a longitudinal vehicle speed of the tank truck as v, and a computational formula is:

$$v = \frac{v_1 + v_2}{2} \quad (6)$$

sub-step 2: determining whether a rollover risk exists in a front road segment or not acquiring a road curvature radius, a longitudinal gradient angle and a transverse gradient angle of a front road through an enhanced digital map, determining whether the rollover risk exists in the front road segment or not when the tank truck passes in combination with the current vehicle speed; if no rollover risk exists, ending control; and if the rollover risk exists, calculating a distance $\Delta\sigma$ between a current position of the tank truck and a front dangerous place and a suggested safety vehicle speed $v_s$, and entering sub-step 3;

sub-step 3: calculating the opening degree of the brake pedal required by deceleration reducing the current vehicle speed v of the tank truck to the safety vehicle speed $v_s$ with a fixed deceleration â, and in combination with the distance $\Delta\sigma$, a computational formula of â is:

$$\begin{cases} v_s = v + \hat{a}t \\ \Delta\sigma = vt + 0.5\hat{a}t^2 \end{cases} \Rightarrow \hat{a} = \frac{v_s^2 - v^2}{2\Delta\sigma} \quad (7)$$

statically measuring the whole truck mass m of the tank truck in advance, and utilizing the formula (1) for determining the opening degree $\hat{\lambda}$ of the brake pedal when the braking deceleration of the tank truck is â; and sub-step 4: determining whether the required opening degree of the brake pedal is larger than an opening degree of the brake pedal operated by a driver the CAN data bus is used for acquiring the opening degree $\lambda$ of the brake pedal operated by the driver, when $\hat{\lambda}>\lambda$, the CAN data bus is used for controlling the EBS for deceleration control with a braking effect of the opening degree $\hat{\lambda}$ of the brake pedal; and when $\hat{\lambda}\leq\lambda$, the EBS performs deceleration control with the braking effect of the opening degree $\lambda$ of the brake pedal operated by the driver; and control is ended.

Beneficial Effects

1. The present invention fits out a function expression of the tank truck braking deceleration and can automatically select a proper braking deceleration under different rollover scenes according to kinematics information of the tank truck and vehicle body information.

2. When the present invention conducts tank truck braking deceleration, an operation of the driver is considered, so that man-machine effective combination is achieved.

3. The method performs relieved braking deceleration when the tank truck is in a potential rollover risk state, a situation that emergency braking is conducted when the tank truck has high rollover risk is avoided, and the tank truck rollover control stability and effectiveness are improved.

DETAILED DESCRIPTION

The following describes the technical solutions provided in the present invention in detail with reference to specific examples. It should be understood that the following specific implementations are merely intended to describe the present invention rather than to limit the scope of the present invention.

Figure 1:
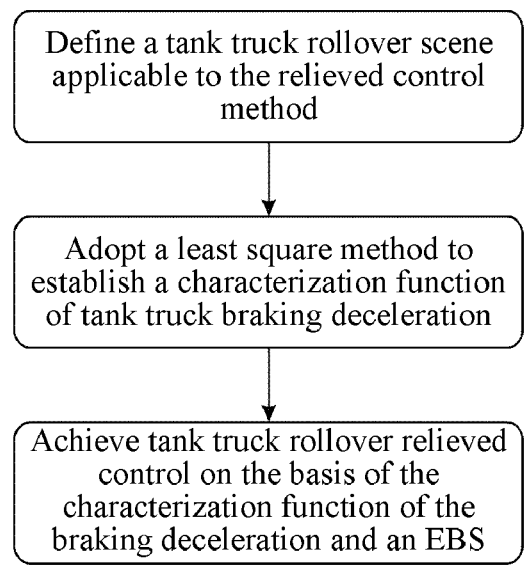
FIG. 1 is a total design scheme drawing for tank truck rollover relieved control.

For a tank truck using an EBS, the present invention provides a tank truck rollover relieved control method based on electronic braking deceleration. Firstly, a tank truck rollover scene applicable to the relieved control method is defined; then, a least square method is adopted to establish a characterization function of tank truck braking deceleration; and finally, tank truck rollover relieved control is achieved on the basis of the characterization function of the braking deceleration and the EBS. The method fits out a function expression of the tank truck braking deceleration and can automatically select a proper braking deceleration under different rollover scenes according to kinematics information of the tank truck and vehicle body information; during tank truck braking deceleration, an operation of a driver is considered, so that man-machine effective combination is achieved; and relieved braking deceleration is conducted when the tank truck is in a potential rollover risk state, a situation that emergency braking is conducted when the tank truck has high rollover risk is avoided, and tank truck rollover control stability and effectiveness are improved. A total design scheme for rollover control is shown in FIG. 1, and specific steps include:

Step 1: a tank truck rollover scene applicable to the relieved control method is defined Steering at high speed is one of important reasons for rollover accidents of the tank truck. An existing rollover control method commonly adopts an emergency braking measure when tank truck steering has high rollover risk; however problems of unstable vehicle body control and unsatisfactory control effect are possibly caused.

Thus, the present invention provides the rollover relieved control method, and the applicable rollover scene includes that a tank truck normally runs at present, but a sharp turn exists in front, and if the tank truck passes through the sharp turn at a current vehicle speed, the tank truck may roll over.

Step 2: a least square method is adopted to establish a characterization function of tank truck braking deceleration There is a direct relationship between a braking deceleration a during running of the tank truck and an opening degree $\lambda$ of a brake pedal of the tank truck, and the larger the opening degree $\lambda$ of the brake pedal is, the larger the braking deceleration a becomes; and meanwhile, a whole truck mass m of the tank truck is larger, the inertia becomes larger, and the difficulty for changing a motion state of the tank truck is higher. Considering the complexity and accuracy of function fitting calculation, a function expression of the tank truck braking deceleration a is defined as:

$$a = c_1\lambda^2 + c_2\lambda + c_3 m^2 + c_4 m + b \quad (1)$$

in formula (1), $c_1$, $c_2$, $c_3$ and $c_4$ are coefficients, and b is a constant term.

When the least square method is adopted for fitting the function expression, real-time measured data is needed for determining unknown terms in the function expression, and therefore a real vehicle braking test is developed to obtain data of the opening degree $\lambda$ of the brake pedal, the whole truck mass m and the braking deceleration a under different scenes.

Scene elements for the braking test include vehicle speed, load and the opening degree of the brake pedal, quantization parameters of each scene element are shown in the following table, and after the scene elements are permutated and combined, there are 3 (vehicle speed)×3 (load)×4 (the opening degree of the brake pedal)=36 test scenes. In order to ensure accuracy of the data, the test is repeatedly conducted twice under each test scene, and totally 72 times of tests are conducted.

| Scene element | Quantization parameters |
|---|---|
| Vehicle speed | 30 km/h, 50 km/h, 70 km/h |
| Load | No load, half load, full load |
| Opening degree of the brake pedal | 20%, 40%, 60%, 80% |

A medium loaded in the tank truck for the braking test is water, and a computational formula of the whole truck mass m of the tank truck is:

$$m = \begin{cases} m' & \text{No load} \\ m' + 0.5\rho V & \text{Half load} \\ m' + \rho V & \text{Full load} \end{cases} \quad (2)$$

in formula (2), m' is a whole truck mass when the tank truck is no-load, V is a volume of the tank truck, $\rho$ is a density of the water, and m' and V are obtained through a tank truck product manual.

After the whole truck mass of the tank truck is determined, in a straight road segment, the tank truck runs at a constant vehicle speed v' of 30 km/h, 50 km/h and 70 km/h, a CAN data bus is used for controlling the brake pedal to decelerate with a certain opening degree of 20%, 40%, 60% and 80% until the vehicle speed of the tank truck is zero, a time from starting deceleration to the zero vehicle speed of the tank truck is recorded as $\Delta t$, and a computational formula of the braking deceleration a is:

$$a = \frac{v'}{\Delta t} \quad (3)$$

After 72 times of the braking test, test data $\{\lambda_i, m_i, a_i\}$ is obtained, i=1, 2, . . . , 72. A square of total errors in the least square method is:

$$J(c_1, c_2, c_3, c_4, b) = \sum_{i=1}^{72}(c_1\lambda_i^2 + c_2\lambda_i + c_3 m_i^2 + c_4 m_i + b - a_i)^2 \quad (4)$$

When the square $J(c_1, c_2, c_3, c_4, b)$ of the total errors is a minimum value, $c_1$, $c_2$, $c_3$, $c_4$ and b are optimal solutions, and a computational formula is:

$$\begin{cases} \frac{\partial J}{\partial c_1} = 0 \\ \frac{\partial J}{\partial c_2} = 0 \\ \frac{\partial J}{\partial c_3} = 0 \to c_1, c_2, c_3, c_4, b \\ \frac{\partial J}{\partial c_4} = 0 \\ \frac{\partial J}{\partial b} = 0 \end{cases} \quad (5)$$

and correspondingly, a functional expression $a = c_1\lambda^2 + c_2\lambda + c_3 m^2 + c_4 m + b$ of the tank truck braking deceleration a is obtained.

Figure 2:
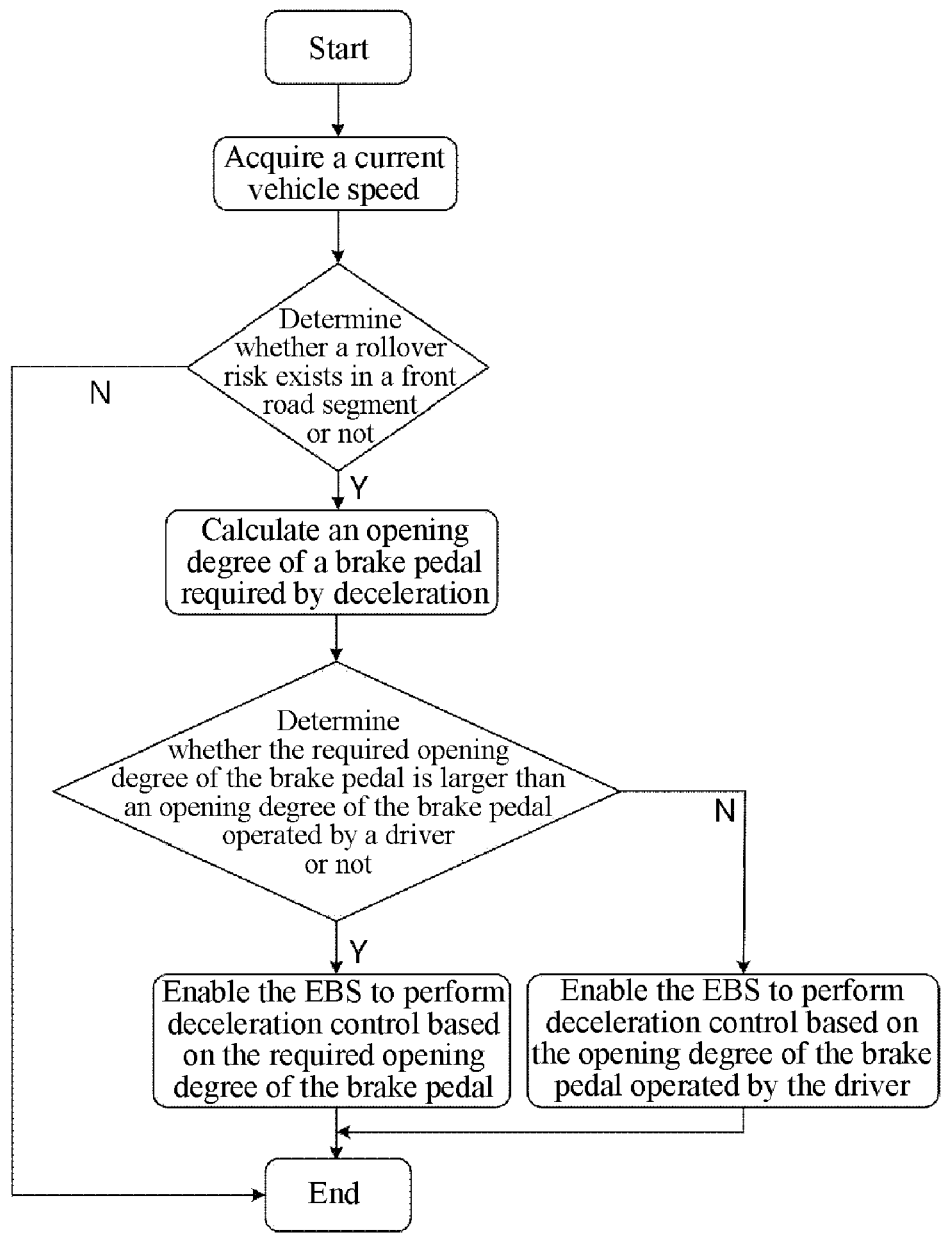
FIG. 2 is a flow chart for tank truck rollover relieved control.

Step 3: tank truck rollover relieved control on the basis of the characterization function of the braking deceleration and EBS is achieved For the problem that the tank truck is likely to roll over during sharp turn at a high vehicle speed, the present invention carries out braking deceleration (the deceleration is low) before the tank truck enters the turn, the vehicle speed can be reduced to the safety vehicle speed when the tank truck enters the turn, and therefore the problem that the control stability of the vehicle body is low due to emergency braking is solved. A rollover control process is shown in FIG. 2, and specific steps include:

Sub-step 1: a current vehicle speed is acquired

Wheel speed sensors are installed on non-steering wheels at two sides of a last shaft of the tank truck, two-side wheel speeds $v_1$ and $v_2$ are output in real time, and a longitudinal vehicle speed of the tank truck is defined as v, and a computational formula is:

$$v = \frac{v_1 + v_2}{2} \quad (6)$$

Sub-step 2: whether a rollover risk exists in a front road segment or not is determined A road curvature radius, a longitudinal gradient angle and a transverse gradient angle of a front road are acquired through an enhanced digital map, and whether the rollover risk exists in the front road segment or not when the tank truck passes is determined in combination with the current vehicle speed. If no rollover risk exists, control is ended; and if the rollover risk exists, a distance $\Delta\sigma$ between a current position of the tank truck and a front dangerous place and a suggested safety vehicle speed $v_s$ are calculated, and the process proceeds to sub-step 3. For specific methods for determining whether the tank truck has the rollover risk in the front road segment or not and calculating $\Delta\sigma$ and $v_s$, please refer to patent "VEHICLE ROLLOVER EARLY WARNING METHOD BASED ON ENHANCED DIGITAL MAP" (Application No.: 201910421233.1).

Sub-step 3: the opening degree of the brake pedal required by deceleration is calculated The current vehicle speed v of the tank truck is reduced to the safety vehicle speed $v_s$ with a fixed deceleration â, and in combination with the distance $\Delta\sigma$, a computational formula of â is:

$$\begin{cases} v_s = v + \hat{a}t \\ \Delta\sigma = vt + 0.5\hat{a}t^2 \end{cases} \Rightarrow \hat{a} = \frac{v_s^2 - v^2}{2\Delta\sigma} \quad (7)$$

The whole truck mass m of the tank truck is statically measured in advance, and the formula (1) is utilized for determining the opening degree $\hat{\lambda}$ of the brake pedal when the braking deceleration of the tank truck is â.

Sub-step 4: determining whether the required opening degree of the brake pedal is larger than an opening degree of the brake pedal operated by a driver The CAN data bus is used for acquiring the opening degree $\lambda$ of the brake pedal operated by the driver, when $\hat{\lambda} > \lambda$, the CAN data bus is used for controlling the EBS for deceleration control with a braking effect of the opening degree $\hat{\lambda}$ of the brake pedal; and when $\hat{\lambda} \leq \lambda$, the EBS performs deceleration control with a braking effect of the opening degree $\lambda$ of the brake pedal operated by the driver. The control is ended.

What is claimed is:

1. A tank truck rollover relieved control method based on electronic braking deceleration, comprising:
   step 1: defining a tank truck rollover scene applicable to the relieved control method wherein the applicable rollover scene comprises that a tank truck normally runs at present, but a sharp turn exists in front, and if the tank truck passes through the sharp turn at a current vehicle speed, the tank truck may roll over;
   step 2: adopting a least square method to establish a characterization function of tank truck braking deceleration
   wherein a function expression of the tank truck braking deceleration a is defined as:

$$a = c_1\lambda^2 + c_2\lambda + c_3m^2 + c_4m + b \quad (1)$$

in formula (1), $c_1$, $c_2$, $c_3$ and $c_4$ are coefficients, and b is a constant term;

scene elements for a braking test comprise one of predetermined vehicle speeds consisting of 30 km/h, 50 km/h, 70 km/h, one of predetermined loads consisting of no load, half load and full load, and one of predetermined opening degrees of a brake pedal consisting of 20%, 40%, 60% and 80%, totaling 36 test scenes existing after the scene elements are permutated and combined, a test is repeatedly conducted twice in each test scene, totaling 72 tests being conducted;

a medium loaded in the tank truck for the braking test is water, and a computational formula of a whole truck mass m of the tank truck is:

$$m = \begin{cases} m' & \text{No load} \\ m' + 0.5\rho V & \text{Half load} \\ m' + \rho V & \text{Full load} \end{cases} \quad (2)$$

in formula (2), m' is a whole truck mass when the tank truck is no-load, V is a volume of the tank truck, $\rho$ is a density of the water, and m' and V are obtained through a tank truck product manual;

in a straight road segment, the tank truck runs at a constant vehicle speed v' of one of 30 km/h, 50 km/h and 70 km/h, a CAN data bus is used for controlling the brake pedal to decelerate with a certain opening degree of one of 20%, 40%, 60% and 80% until the vehicle speed of the tank truck is zero, a time from starting deceleration to the zero vehicle speed of the tank truck is recorded as $\Delta t$, and a computational formula of the braking deceleration a is:

$$a = \frac{v'}{\Delta t} \quad (3)$$

after 72 times of the braking test, test data $\{\lambda_i, m_i, a_i\}$ is obtained, i=1, 2, . . . , 72; a square of total errors in the least square method is:

$$J(c_1, c_2, c_3, c_4, b) = \sum_{i=1}^{72}(c_1\lambda_i^2 + c_2\lambda_i + c_3m_i^2 + c_4m_i + b - a_i)^2 \quad (4)$$

when the square $J(c_1, c_2, c_3, c_4, b)$ of the total errors is a minimum value, $c_1$, $c_2$, $c_3$, $c_4$ and b are optimal solutions, and a computational formula is:

$$\begin{cases} \frac{\partial J}{\partial c_1} = 0 \\ \frac{\partial J}{\partial c_2} = 0 \\ \frac{\partial J}{\partial c_3} = 0 \rightarrow c_1, c_2, c_3, c_4, b \\ \frac{\partial J}{\partial c_4} = 0 \\ \frac{\partial J}{\partial b} = 0 \end{cases} \quad (5)$$

correspondingly, a functional expression $a = c_1\lambda^2 + c_2\lambda + c_3m^2 + c_4m + b$ of the tank truck braking deceleration a is obtained; and step 3: achieving tank truck rollover relieved control on the basis of the characterization function of the braking deceleration and EBS sub-step 1: acquiring a current vehicle speed installing wheel speed sensors on non-steering wheels at two sides of a last shaft of the tank truck, outputting two-side wheel speeds $v_1$ and $v_2$ in real time, and defining a longitudinal vehicle speed of the tank truck as v, wherein a computational formula is:

$$v = \frac{v_1 + v_2}{2} \tag{6}$$

sub-step 2: determining whether a rollover risk exists in a front road segment or not acquiring a road curvature radius, a longitudinal gradient angle and a transverse gradient angle of a front road through an enhanced digital map, determining whether the rollover risk exists in the front road segment or not when the tank truck passes in combination with the current vehicle speed; if no rollover risk exists, ending control; and if the rollover risk exists, calculating a distance $\Delta\sigma$ between a current position of the tank truck and a front dangerous place and a suggested safety vehicle speed $v_s$, and entering sub-step 3;

sub-step 3: calculating the opening degree of the brake pedal required by deceleration reducing the current vehicle speed v of the tank truck to the safety vehicle speed $v_s$ with a fixed deceleration â, and in combination with the distance $\Delta\sigma$, a computational formula of â is:

$$\begin{cases} v_s = v + ât \\ \Delta\sigma = vt + 0.5ât^2 \end{cases} \Rightarrow â = \frac{v_s^2 - v^2}{2\Delta\sigma} \tag{7}$$

statically measuring the whole truck mass m of the tank truck in advance, and utilizing the formula (1) for determining the opening degree $\hat{\lambda}$ of the brake pedal when the braking deceleration of the tank truck is â; and sub-step 4: determining whether the required opening degree of the brake pedal is larger than an opening degree of the brake pedal operated by a driver wherein the CAN data bus is used for acquiring the opening degree $\lambda$ of the brake pedal operated by the driver, when $\hat{\lambda} > \lambda$, the CAN data bus is used for controlling the EBS for deceleration control with a braking effect of the opening degree $\hat{\lambda}$ of the brake pedal; and when $\hat{\lambda} \leq \lambda$, the EBS performs deceleration control with a braking effect of the opening degree $\lambda$ of the brake pedal operated by the driver; and control is ended.

* * * * *